United States Patent [19]
Katamoto

[11] Patent Number: 5,199,983
[45] Date of Patent: Apr. 6, 1993

[54] BLACK PIGMENT PARTICLES

[75] Inventor: Tsutomu Katamoto, Hiroshima, Japan

[73] Assignee: Toda Kogyo Corp., Hiroshima, Japan

[21] Appl. No.: 859,243

[22] Filed: Mar. 26, 1992

Related U.S. Application Data

[63] Continuation of Ser. No. 526,820, May 22, 1990, abandoned.

[30] Foreign Application Priority Data

May 30, 1989 [JP] Japan .................................. 1-137751

[51] Int. Cl.$^5$ ........................... C09C 1/24; C09C 1/36
[52] U.S. Cl. .................................... 106/459; 106/439; 106/456; 106/460; 252/519; 427/127; 428/403; 430/106.6
[58] Field of Search ............... 106/439, 459, 460, 456; 252/519; 427/127; 430/106.6; 428/403

[56] References Cited

U.S. PATENT DOCUMENTS

| | | | |
|---|---|---|---|
| 3,869,298 | 3/1975 | Suzuki et al. | 106/439 |
| 4,036,662 | 7/1977 | Rademachers et al. | 106/439 |
| 4,082,905 | 4/1978 | Stephan et al. | 106/439 |
| 4,373,963 | 2/1983 | Uenishi et al. | 106/439 |
| 4,631,089 | 12/1986 | Rademachers et al. | 106/456 |
| 4,781,981 | 11/1988 | Katamoto et al. | 427/127 |
| 4,917,952 | 4/1990 | Katamoto et al. | 252/519 |
| 4,966,641 | 10/1990 | Westerhaus | 106/460 |

FOREIGN PATENT DOCUMENTS 282329A  9/1988  European Pat. Off. ............ 106/439

Primary Examiner—William R. Dixon, Jr.
Assistant Examiner—Scott L. Hertzog
Attorney, Agent, or Firm—Nixon & Vanderhye

[57] ABSTRACT

Disclosed herein are black pigment particles comprising polycrystalline particles having a mixed composition of $Fe_2TiO_5$ and $Fe_2O_3$—$FeTiO_3$ solid solution.

6 Claims, 1 Drawing Sheet ( X 100000 )

(×100000)

BLACK PIGMENT PARTICLES

This is a continuation of application Ser. No. 07/526,820, filed May 22, 1990, now abandoned.

BACKGROUND OF THE INVENTION

The present invention relates to black pigment particles which are non-magnetic, safe and harmless, and excellent in workability and heat resistance.

The black pigment particles according to the present invention are particularly useful as a developing toner, coloring materials for paint, coloring materials for resins, and the like.

Generally black pigment particles are widely used as a developing toner by mixing and dispersing the pigment particles in a resin and then molding, or as coating materials by mixing and dispersing the said pigment particles in a vehicle.

Recently, black pigment particles which are non-magnetic, safe and harmless, and also excellent in workability and heat resistance, has been strongly demanded from the standpoints of enhancement of working efficiency in the age of energy saving, safety and sanitation, and improvement of properties.

For the improvement of workability of the pigment particles, it is imperative that the pigment particles are non-magnetic and have good dispersibility with an appropriate range of size, and are offered in the form of powder which is easy to handle by possessing a high apparent density and an appropriate range of size.

Heat resistance is also requisite for the said black pigment particles because these particles when being used for developing toner are required to be stable in hue even at high temperatures above 150° C., since the developing toner, whose demand is growing with the spread of copying devices in recent years, is heated to a high temperature over 150° C. in its production process.

Hitherto, magnetite particles and carbon black particles have been popularly used as black pigment particles.

Thus, the black pigment particles which are non-magnetic, safe and harmless, and also excellent in workability and heat resistance are now most acutely required. The known magnetite particles, because of their magnetism, tend to repeat mutual agglomeration to deteriorate their dispersibility, resulting in poor workability. Also, the magnetite particles begin to transform into maghemite particles at a temperature above 150° C. and are changed in color from black to liver brown, and therefore, they are unsatisfactory in heat resistance. On the other hand, a carbon black, although excellent in heat resistance, is hard to handle and bad in workability because it is a powder comprising ultra-fine particles with a size of 0.01–0.1 μm while having a high apparent density of around 0.1 g/cm³. It is also pointed out that the carbon black is problematic in the aspect of safety and sanitation such as carcinogenicity thereof, etc.

Accordingly, the technical subject of the present invention is to provide black pigment particles which are non-magnetic, safe and harmless, and also excellent in workability and heat resistance.

As a result of the present inventors' studies for obtaining the black pigment particles described above, it has been found that polycrystalline particles having a mixed composition of $Fe_2TiO_5$ and $Fe_2O_3$—$FeTiO_3$ solid solution, produced by subjecting magnetite particles having their surfaces coated with a titanium compound, a mixture of magnetite particles and a titanium compound, or reduced particles obtained by reducing the hematite particles having their surfaces coated with a titanium compound, to heat-treatment at a temperature of not less than 700° C. under a non-oxidizing atmosphere, and pulverizing the thus treated particles, can fulfill the above-mentioned purpose. The present invention has been attained on the basis of this finding.

SUMMARY OF THE INVENTION

In a first aspect of the present invention, there are provided black pigment particles comprising polycrystalline particles having a mixed composition of $Fe_2TiO_5$ and $Fe_2O_3$—$FeTiO_3$ solid solution.

In a second aspect of the present invention, there are provided black pigment particles for developing toner comprising polycrystalline particles having an average particle size of 0.1 to 0.5 μm and a mixed composition of $Fe_2TiO_5$ and $Fe_2O_3$—$FeTiO_3$ solid solution.

DETAILED DESCRIPTION OF THE INVENTION

Figure 1:
FIG. 1 and FIG. 2 are an electron micrograph (×100,000) showing the structure of a black pigment particle according to the present invention and an X-ray diffraction pattern of the particle, respectively.

In the particle composition of the present invention comprising $Fe_2TiO_5$ and $Fe_2O_3$—$FeTiO_3$ solid solution, the ratio of $Fe_2TiO_5$ is 1–40 wt %, and the ratio of Ti to Fe(II) and Fe(III) in the polycrystalline particle is 15–50 atom %.

The lightness L* of the black pigment particles of the present invention is 18 to 25, preferably 18 to 23, and the chroma $C^*ab = \sqrt{a^{*2}+b^{*2}}$ is 0.2 to 4.0, preferably 0.2 to 2.0 (wherein L*, a* and b* are the values indicated by (L*, a*, b*) uniform sensory color space of CIE 1976).

The black pigment particles according to the present invention have a magnetization of about 0.5 to 5.0 emu/g, preferably 0.5 to 2.0 emu/g, and are almost non-magnetic.

The pigment particles of the present invention also have an apparent density within the range of 0.5 to 1.2 g/cm³, preferably 0.6 to 1.1 g/cm³.

The size of the polycrystalline particles according to the present invention is within the range of 0.05 to 2.0 μm, preferably 0.1 to 1.0 μm. When the particles of the present invention are used as coloring pigment particles for developing toner, it is preferable that the particles have an average size of 0.1 to 0.5 μm, considering facilitation of mixing and dispersion of the particles in resins.

The polycrystalline particle having a mixed composition of $Fe_2TiO_5$ and $Fe_2O_3$—$FeTiO_3$ solid solution according to the present invention is black in color, non-magnetic, safe and harmless, easy to handle owing to an appropriate particle size and a high apparent density, and also excellent in heat resistance.

The particle size of toner generally used at present is about 10 μm. There is, however, a tendency toward decrease of the particle size in conformity to enhancing performance of toner, and this is causing a complaint that the toner particles obtained by using carbon black with a low apparent density are hard to classify in the toner production process because of small specific gravity. The black pigment particles comprising polycrystalline particles according to the present invention are free of such a problem because the toner particles obtained by using the said black pigment particles have a sufficiently large specific gravity owing to a high apparent density, for example, 4.0 to 5.5 g/cm$^3$ and are therefore easy to classify.

The black pigment particles according to the present invention have so excellent heat resistance because they are scarcely changed in color even when exposed to such a high temperature as around 300° C.

The black pigment particles according to the present invention can be obtained by subjecting magnetite (FeO$_x$.Fe$_2$O$_3$, wherein $0.5 \leq X \leq 1$) particles having their surfaces coated with a titanium compound, mixture of the magnetite (FeO$_x$.Fe$_2$O$_3$, wherein $0.5 \leq X \leq 1$) particles and a titanium compound, or reduced particles obtained by reducing hematite particles having their surface coated with a titanium compound, to a heat-treatment at a temperature not less than 700° C. under a non-oxidizing atmosphere, and pulverizing the thus treated particles. Use of magnetite (FeO$_x$.Fe$_2$O$_3$, wherein $0.5 \leq X \leq 1$) particles coated with a titanium compound as starting material is preferred because it is easy to obtain the particles with low magnetization and such particles are essentially non-magnetic.

The magnetite (FeO$_x$.Fe$_2$O$_3$, wherein $0.5 \leq X \leq 1$) particles or hematite particles used in the present invention may be of any shape such as granular, spherical, acicular, etc., and the size of these particles used is from about 0.03 to 1.5 µm.

There is correlation between the size of the starting particles and that of the product particles, that is, normally when using the starting particles with a small size, the product particles are also small in size, and when using the starting particles with a large size, there are obtained the product particles large in size.

As the titanium compound coated on or mixed with the said starting particles, there can be used hydrous oxides, hydroxides and oxides of titanium. When a titanium compound is mixed with magnetite (FeO$_x$.Fe$_2$O$_3$, wherein $0.5 \leq X \leq 1$) particles, it is preferred to use a water-soluble titanium compound. The amount of titanium compound used in the particle preparation is 15.0 to 50.0 atom %, preferably 20 to 40 atom %, calculated as Ti, based on Fe(II) and Fe(III) in magnetite particle. In the case of less than 15.0 atom %, calculated as Ti, base on Fe(II) and Fe(III), the magnetization of the obtained black pigment particle increases, while in the case of more than 50.0 atom %, calculated as Ti, based on Fe(II) and Fe(III), though enabling obtainment of the desired non-magnetic black pigment particle, any extra effect can not be obtained.

N$_2$ gas or the like can be used as non-oxidizing atmosphere in the heat treatment. When the atmosphere is oxidizing, the objective black pigment particles can not be obtained.

The amount of Ti in the polycrystalline particles of the present invention is 15 to 50 atom %, preferably 20 to 40 atom % based on the sum of Fe(II) and Fe(III) therein.

The temperature for the heat-treatment needs to be not lower than 700° C., preferably 720° to 800° C. When the heat-treatment temperature is below 700° C., there takes place no sufficient solid-phase reaction between iron oxide and titanium compound, and the desired black pigment particles can not be obtained.

Pulverization of the obtained particles can be accomplished by using a commonly employed pulverizer such as ball mill, attritor, vibration mill and the like.

In the above process, the starting particles may be coated with a known sintering inhibitor before subjecting to the heat-treatment. In this case, the sintering of the particle and between the particles in the heat-treatment is prevented, thereby obtaining the black pigment particles having good dispersibility. A compound composed of at least one element selected from Al, Ti, Si, Zr and P can be used as the sintering inhibitor which is safe from impairing the normal properties of the black pigment particles in the present invention. The amount of the sintering inhibitor element used in the present invention is 0.1 to 15.0 atom %, preferably 0.1 to 5.0 atom % based on the amount of Fe and Ti. For obtaining a satisfactory sintering inhibitive effect, it is preferable to add the sintering inhibitor in an amount of not less than 0.1 atom %. But when its amount exceeds 15.0 atom %, magnetite is mixed in the produced black pigment particles, and as a result it is difficult to obtain the desired non-magnetic black pigment particles.

The black pigment particles of the present invention suffer a decrease in lightness L* of not more than 3.0 and an increase in chroma C* of not more than 1.0 after the heat-treatment. These results demonstrate that the said pigment particles remain almost free of color change from black and have excellent heat resistance.

Further, the black pigment particles according to the present invention are easy to handle and excellent in workability owing to their high apparent density which is 0.5 to 1.2 g/cm$^3$. Moreover, the pigment particles of the present invention are free of re-agglomeration and show good dispersibility as their magnetization is as low as 0.5 to 5.0 emu/g.

As described above, the black pigment particles according to the present invention are non-magnetic, safe and harmless, and also excellent in workability and heat resistance, so that they can be advantageously used as developing toner, coloring material for paint, coloring material for coating resins, and the like.

EXAMPLES

The present invention will be more precisely explained while referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

The average sizes of the particles shown in the following Examples and Comparative Examples are the average of the values determined from electron micrographs.

The magnetization of the particles shown below are the ones determined in a magnetic field of 10 KOe.

The ratio between Fe$_2$TiO$_5$ and Fe$_2$O$_3$—FeTiO$_3$ solid solution was shown by the value of strength ratio of main peaks on an X-ray spectrum commonly used as an index showing the existing proportions (by volume).

As for the L* value (lightness), a* value and b* value, the color of each test sample was measured for L*, a* and b* by Hunter's Lab space by using amulti-light-source spectrocolorimeter MSC-IS-2D (mfd. by Suga Testing Machines Mfd. Co., Ltd.) and they (L*, a* and b*) were shown by the values indicated according to (L*, a*, b*) uniform sensory color space of CIF 1976.

Each test sample was prepared by kneading together 0.5 g of black pigment particles and 1.0 cc of castor oil by a Hoover muller to form a paste-like substance, then adding thereto 4.5 g of clear lacquer, kneading them to form a coating material, and applying this coating material on a cast coated paper sheet by a 6-mil applicator.

EXAMPLE 1

100 g of granular magnetite particles having an average particle size of 0.2 μm and a magnetization of 85.0 emu/g were mixed and dispersed in an aqueous solution containing 0.26 mol of $TiOSO_4$ (Ti/Fe=20.0 atom %). This suspension was neutralized by adding NaOH, a hydroxide of Ti was deposited on the particle surfaces by adjusting pH to 8, and then the obtained particles were filtered and dried. A fluorescent X-ray analysis of the obtained magnetite particles having their surfaces coated with a hydroxide of Ti in which an amount of Ti(IV) in the magnetite particle was 21.0 atom % based on the sum of Fe(II) and Fe(III).

50 g of the granular magnetite particles thus obtained were heat-treated at 750° C. under an $N_2$ gas stream for 120 minutes and then pulverized to obtain fine black particles.

Figure 2:
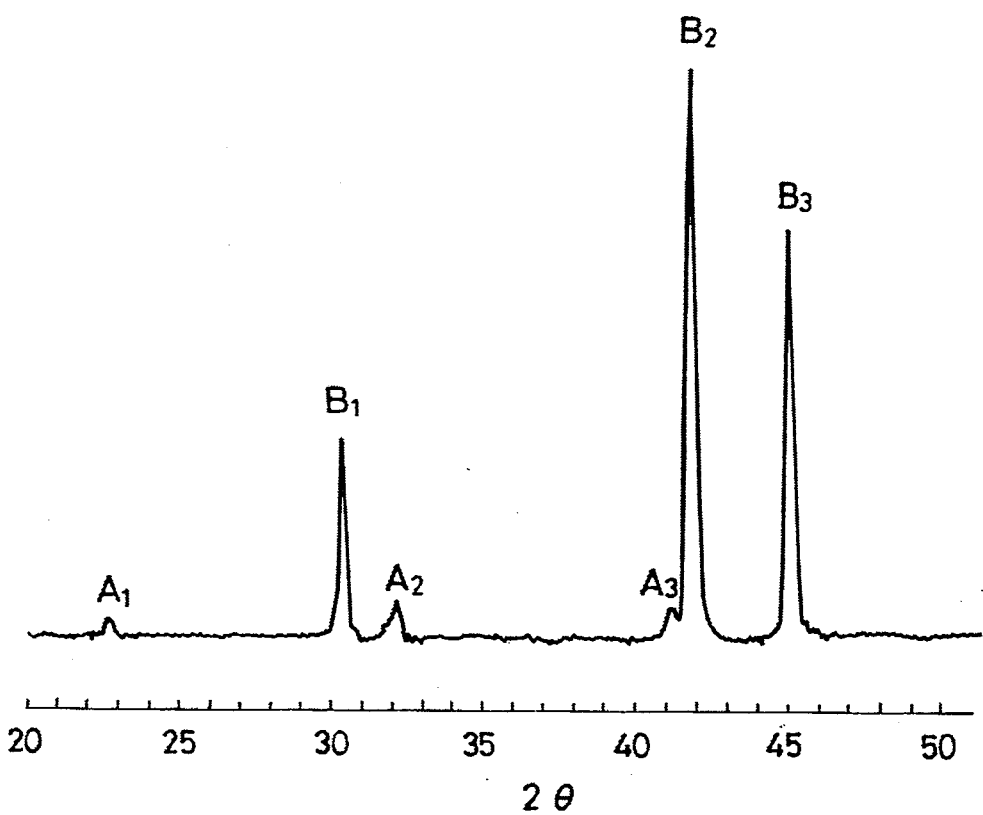

The black particles thus obtained had an average particle size of 0.25 μm as shown in an electron micrograph (×100,000) of FIG. 1 and were composed of a mixed composition of $Fe_2TiO_5$ and $Fe_2O_3$—$FeTiO_3$ solid solution as shown in an X-ray diffraction pattern of FIG. 2. In the diffraction pattern, peak A denotes $Fe_2TiO_5$ and peak B denotes $Fe_2O_3$—$FeTiO_3$ solid solution.

The ratio of $Fe_2TiO_5$ to $Fe_2O_3$—$FeTiO_3$ solid solution, as determined by measuring strength ratio of their respective main peaks $A_2$ and main X-ray peaks $B_2$, was 0.09:1.

The black particles also had a lightness (L*) of 24.5, a chroma ($C^*ab = \sqrt{a^{*2}+b^{*2}}$) of 1.0, an apparent density of 0.8 g/cm$^3$ and a magnetization of 0.6 emu/g.

2.0 g of these black particles were further heat-treated at 300° C. in the air for 60 minutes. The resulting product had a lightness L* of 21.7 and a chroma $C^*ab = \sqrt{a^{*2}+b^{*2}}$ of 1.9, both of which were little different from those before the heat-treatment.

EXAMPLES 2, 4 AND 5

Black pigment particles were obtained by following the same procedure as Example 1 except for change of the kind of starting particles, the kind, amount and coating method of Ti compound, the amount of urea, enforcement of the treatment with a sintering inhibitor, the kind and amount of the sintering inhibitor, and the temperature and time of the heat treatment.

The main producing conditions in the above Examples and the properties of the obtained products are shown in Table 1 and Table 2, respectively.

EXAMPLE 3

100 g of the same granular magnetite particles as Example 1 were mixed and dispersed in an aqueous solution containing 0.45 mol of $TiOSO_4$ (Ti/Fe=35.0 atom %). The suspension was added with 2.72 mol of urea, kept at 95° C. under stirring for 180 minutes to hydrolyze $TiOSO_4$, thereby depositing a hydroxide of Ti on the particle surfaces, and then the thus obtained particles filtered and dried. A fluorescent X-ray analysis of the obtained granular magnetite particles having their surfaces coated with a hydroxide of Ti in which the amount of Ti(IV) in the particle was 37.0 atom % based on the sum of Fe(II) and Fe(III). 50 g of the thus obtained granular magnetite particles coated with a hydroxide of Ti on the surfaces were immersed in an aqueous solution containing 0.009 mol of $Al_2(SO_4)_3$, thereby depositing a hydroxide of aluminum on the hydroxide of Ti on the particle surfaces. The thus obtained particles were heat-treated at 750° C. under an $N^2$ gas stream for 120 minutes and pulverized to obtain the black particles.

The main producing conditions in the above process and the properties of the obtained product are shown in Table 1 and Table 2, respectively.

REFERENTIAL EXAMPLE 1

The same granular magnetite particles (lightness L* = 16.9, chroma C* ab = 1.10) as Example 1 were subjected to a heat resistance test in the same way as Example 1. The magnetite particles after the heat treatment had a lightness (L*) of 35.3 and a chroma ($C^*ab = \sqrt{a^{*2}+b^{*2}}$) of 72.0, from which it is noted that the particles suffered a great color variation in comparison with the particles before the heat-treatment, indicating poor heat resistance of these particles.

TABLE 1

| | Starting particles | | | Coating with Ti compound | | | | Sintering inhibitor | | Heat-treatment | |
|---|---|---|---|---|---|---|---|---|---|---|---|
| | Type | Average size (μm) | Magnetization (emu/g) | Kind of Ti compound | Amount (atom %) | Method | Amount of urea (mol) | Kind | Amount (atom %) | Temp. (°C.) | Time (min) |
| Example 1 | Granular magnetite | 0.2 | 85 | TiOSO$_4$ | 20.0 | Neutralization | — | — | — | 750 | 120 |
| 2 | Granular magnetite | 0.2 | 85 | TiCl$_4$ | 30.0 | Neutralization | — | ZrOCl$_2$ | 2.0 | 770 | 60 |
| 3 | Granular magnetite | 0.2 | 85 | TiOSO$_4$ | 35.0 | Hydrolysis | 2.72 | Al$_2$(SO$_4$)$_3$ | 3.0 | 750 | 120 |
| 4 | Granular magnetite | 0.1 | 82 | TiOSO$_4$ | 25.0 | Neutralization | — | #3 water glass | 1.0 | 750 | 120 |
| 5 | Granular magnetite | 0.5 | 88 | TiOSO$_4$ | 33.0 | Hydrolysis | 2.56 | #3 water glass | 1.0 | 750 | 120 |
| | | | | | | | | Sodium hexametaphosphate | 1.0 | | |

TABLE 2

| | Produced black pigment particles | | | | | | Color | | | |
|---|---|---|---|---|---|---|---|---|---|---|
| | Average size (μm) | Apparent density (g/cm³) | Strength ratio of main peaks of $Fe_2TiO_3$ and solid solution | Ti/ [Fe(II) + Fe(III)] (atom %) | Amount of sintering inhibitor (atom %) | Magnetization σs (emu/g) | Before heat-treatment | | After heat-treatment | |
| | | | | | | | Lightness L* | Chroma C* ab | Lightness L* | Chroma C* ab |
| Example 1 | 0.25 | 0.8 | 0.09:1 | 21.0 | — | 0.6 | 24.5 | 1.0 | 21.7 | 1.9 |
| 2 | 0.23 | 0.8 | 0.10:1 | 31.0 | Zr/(Fe + Ti) 2.0 | 2.5 | 22.0 | 0.9 | 21.0 | 1.6 |
| 3 | 0.23 | 0.8 | 0.11:1 | 37.0 | Al/(Fe + Ti) 2.9 | 2.4 | 21.1 | 0.9 | 20.8 | 1.4 |
| 4 | 0.14 | 0.7 | 0.07:1 | 25.0 | Si/(Fe + Ti) 1.0 | 0.7 | 19.4 | 0.8 | 19.3 | 1.2 |
| 5 | 0.70 | 0.9 | 0.10:1 | 35.0 | Si/(Fe + Ti) 1.0 P/(Fe + Ti) 1.0 | 1.5 | 23.5 | 0.9 | 23.1 | 1.4 |

What is claimed is:

1. Black pigment particles having an apparent density of 0.5 to 1.2 g/cm³ and consisting essentially of polycrystalline particles having an average particle size of 0.05 to 2.0 μm and composed of a mixed composition of 1 to 40% by weight of $Fe_2TiO_5$ and $Fe_2O_3 \cdot FeTiO_3$ solid solution, the amount of Ti in said polycrystalline particles being 15 to 20 atom % based on the total amount of Fe(II) and Fe(III).

2. The black pigment particles according to claim 1, which have a lightness L* of 18 to 25, a chroma C* of 0.2 to 4.0, and a magnetization of 0.5 to 5.0 emu/g.

3. The black pigment particles according to claim 1, said polycrystalline particles have their surfaces coated with an oxide of at least one element selected from Al, Ti, Si, Zr and P.

4. A black pigment for a developing toner, having an apparent density of 0.05 to 1.2 g/cm³ and comprising polycrystalline particles having an average particle size of 0.05 to 2.0 μm and composed of a mixed composition of 1 to 40% by weight of $Fe_2TiO_5$ and $Fe_2O_3 \cdot FeTiO_3$ solid solution, the amount of Ti in said polycrystalline particles being 15 to 50 atom % based on the total amount of Fe(II) and Fe(III).

5. A developing toner having a specific gravity of 4.0 to 5.5 g/cm³ comprising said black pigment as defined in claim 4.

6. A black pigment for developing toner according to claim 4 wherein polycrystalline particles have their surface coated with an oxide of at least one element selected from Al, Ti, Si, Zr and P.

* * * * *

UNITED STATES PATENT AND TRADEMARK OFFICE
CERTIFICATE OF CORRECTION

PATENT NO. : 5,199,983
DATED : April 6, 1993
INVENTOR(S) : TSUTOMU KATAMOTO

It is certified that error appears in the above-identified patent and that said Letters Patent is hereby corrected as shown below:

Column 7, line 26 (claim 1), delete "20" insert --50--.

Signed and Sealed this

Twenty-fifth Day of January, 1994

Attest:

BRUCE LEHMAN

Attesting Officer     Commissioner of Patents and Trademarks